Patented Oct. 25, 1949

2,485,798

UNITED STATES PATENT OFFICE 2,485,798

PROCESS OF POLYMERIZATION

Stanley Whyte and Daniel D. Whyte, New York, N. Y., said Stanley Whyte assignor to said Daniel D. Whyte Application July 17, 1945, Serial No. 605,621

2 Claims. (Cl. 18—58)

This invention relates to the preparation of polymerized organic compounds being particularly directed to a process for preparing a polymerized organic compound in solid form.

It is an object of this invention to provide a novel method of forming polymerized products in solid form from monomeric liquid compositions, utilizing molds formed of material chemically unreactive with the liquid monomer, the solid polymer and the liquid heating medium in which the mold is maintained for and during polymerization, and wherein the mold is readily strippable or separable from the formed solid polymer.

Generally, it is an object of this invention to provide a method of polymerizing and molding products from liquid monomers under controlled heat of a liquid bath which comprises applying as the reaction mold, a shell having negligible thickness and relatively small diameter or cross-section, such mold being formed of a material which is unreactive with the liquid monomer, the solid polymer or the liquid heating medium and mechanically or chemically strippable from the end product polymer.

These and other objects, advantages and novel features of the invention will be apparent from the following description and the accompanying drawing.

Figure 1:
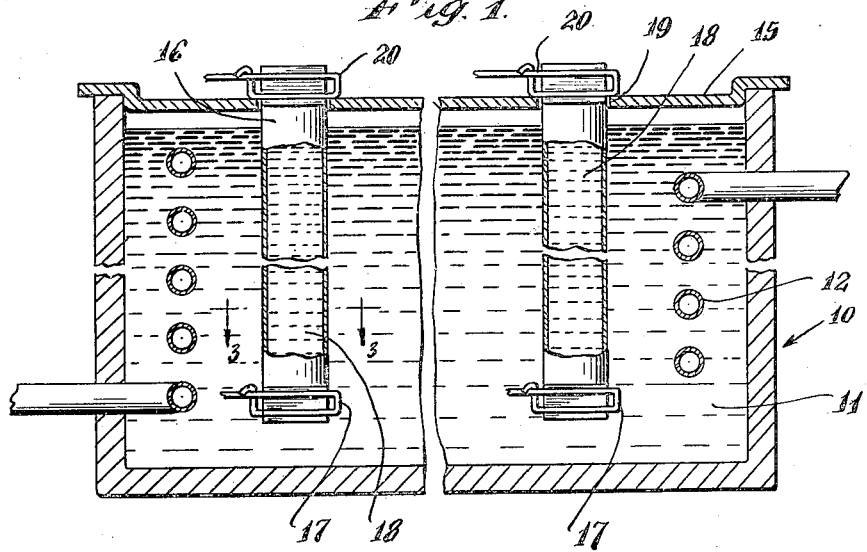
Fig. 1 is a plan elevation in section showing a shell filled with monomeric liquid immersed in a heating bath for polymerization.

In one embodiment of our process we apply as an essential element thereof a mold for the monomeric liquid composition in the form of a shell or tube of negligible thickness, relatively small in diameter and of varying length, which shell or tube is formed of a cellulosic composition solidified in the form of a film from a cellulose solution such as viscose, known as "cellophane." This shell, which may be seamless is preferably of a thickness of approximately .001", interior diameter of 1.5" and length about 8' to 10'.

A series of such shells formed of the tubing aforesaid and sealed at one end, are substantially filled with a liquid monomer such as styrene monomer to which is added as an accelerator, dibenzoyl peroxide and the other end sealed.

The series of thus charged shells are immersed in an oil heating bath, the temperature of which is maintained at 100° C. for the first 24 hours, during which the greater part of the exothermic reaction involved in the transition from monomer to polymer takes place, after which the shell is maintained in the heating bath for a further period up to 24 hours or less, dependent upon whether the temperature therein is maintained at 100° C. or raised up to 110° or 120°.

Upon complete formation of the solid polymer, the shell carrying the same is removed from the controlled heat bath and the shell is stripped either mechanically or by solution in a solvent, as for example, cupra-ammonium solution which attacks the shell by swelling to an extent that the same may be washed off or readily physically removed from the solid polymer, this solvent having no reaction on the polymer.

As illustrated in the respective figures of the drawing, one embodiment for effectuating the method of our invention involves the following apparatus: Two tanks are provided; the first, a polymerizing tank 10 in which oil bath 11 is maintained at the required temperature range by heating coils 12; and the second, a stripping tank 13 containing a shell dissolving fluid of the nature of a cuprammonium solution 14. Each tank has at its top a series of apertured support strips 15 extending thereacross.

Figure 3:
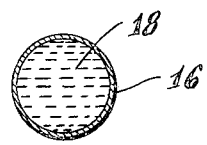
Fig. 3 is a plan view in section taken along lines 3—3 of Fig. 1.
Figure 4:
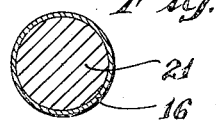
Fig. 4 is a plan view in section taken along lines 4—4 of Fig. 2.

The collapsible shells 16 here illustrated as being cylindrical and of small diameter are sealed at their lower ends by clamps 17, filled with liquid monomer 18 and passed through the apertures 19 of the support strips 15 to the heating bath shown in Fig. 1, the filled shells being then sealed at their upper ends by clamps 20 which are of greater length than the diameter of the strip apertures 19 so that the sealed shell can be maintained in vertical position. Heat is applied in the manner and for the period hereinbefore outlined until the monomer polymerizes within the shell from the liquid form 18 shown in the cross-section of Fig. 3 to the solid form 21 shown in the cross-section of Fig. 4.

Figure 2:
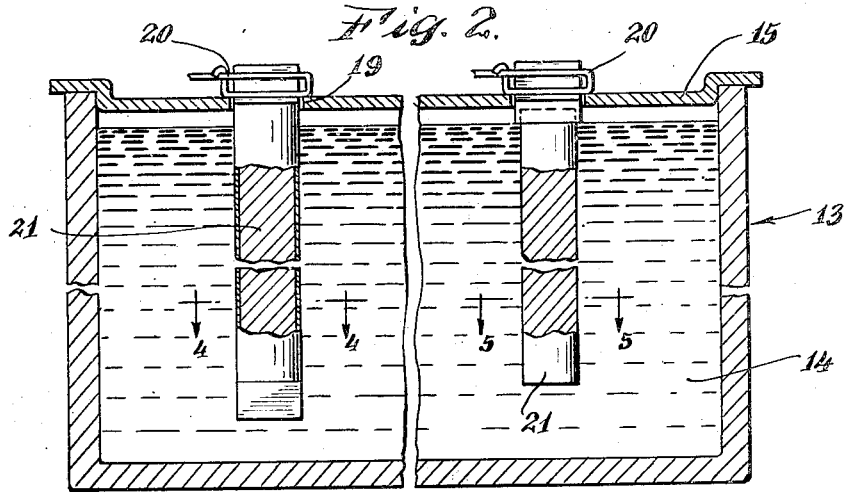
Fig. 2 is a plan view in section showing, respectively, shells incorporating polymerized composition, one of which is in the process of being stripped and the other of which has been stripped from the polymer.
Figure 5:
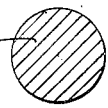
Fig. 5 is a plan view in section taken along lines 5—5 of Fig. 2.

The thus-polymerized monomer carried in the shells and maintained on their respective supporting strips are transported to and immersed in the stripping tank of Fig. 2, the representative shell containing the polymer at the left of such figure representing the initial condition thereof and at the right of the figure representing the solid polymer from which the dissolved shell has been stripped.

Although we have shown a particular mechanical assembly for accomplishing the desired heating for polymerization and the stripping of the shell from the thus-formed solid polymer, it is within the province of our invention to effectuate the method thereof by other apparatus.

Since the tubing is a cellulosic product, the same may be regenerated in any well known manner and re-used.

We have found by use of shells of negligible thickness and small diameter that the heat developed during the strong exothermic reaction involved in the step of polymerization is quickly transferred from the reaction zone within the shell and readily transmitted through the thin shell wall into the controlled heating liquid.

Although we have illustrated in our preferred embodiment the use of our cellulosic material of negligible thickness for containing the polymerizable monomer, we have used among other materials, any material that can be fabricated into a tube of negligible thickness that has the following general properties:

1. The material may have a thickness from .00025" to .050" and internal diameter from ¼" to 1½".
2. It must be insoluble and only negligibly swellable in the heating media and the liquid monomer, and not interactable with the solid polymer.
3. It must be easily physically or chemically strippable from the end product solid polymer without affecting the polymer.
4. It must be heat stable at the temperatures of polymerization which range generally from 20° C. to 125° C.

We need not be concerned with the pressures developed against the shell walls by the height of the column of liquid monomer contained therein, since the specific gravity of the bath within which the shell carrying the liquid monomer is immersed, is approximately equal to that of the liquid monomer. Therefore, even with such thickness of shells, as of the order of .00025" to .050" we have found that there is no bursting or splitting of the shell carrying columns of monomer as high as 30'.

We have found, in addition to our preferred embodiment above specified, that we may use polyvinyl alcohol and methyl cellulose as mold shells for monomers such as styrene or methyl methacrylate with a heat control bath of oil, such shells being strippable after the formation of the solid polymer, either with water, in which said materials are soluble, or by mechanical means.

We have also found that metal foils having a thickness of the order of .00025" to .001" may be used and stripped in the manner aforementioned.

Wherever the expression "solid" has been used to define the nature of the end product polymer, the same is intended to define an end product from a rubber-like consistency to one of extreme rigidity.

Various changes and modifications may be made to the details of the invention without departing from the broader spirit and scope thereof, as set forth in the following claims.

We claim:

1. Process of polymerizing a liquid composition comprising a monomeric polymerizable organic compound which comprises introducing a substantial volume of the liquid composition into a non-rigid, substantially collapsible shell of material unreactive with respect to the liquid composition and the solid polymer formed therefrom, said shell being of a thickness of the order of .00025" to .050" and assuming a predetermined configuration when filled, immersing the shell carrying the liquid composition in a heating bath unreactive with the material of said shell for a period and at a temperature sufficient to polymerize the liquid composition into a solid polymerized product and after the formation of the solid polymer applying to the shell a reagent having a solvent reaction with respect only upon the shell, for stripping the shell from the solid polymer.

2. Process of polymerizing a liquid composition comprising a monomeric polymerizable organic compound which comprises introducing a substantial volume of liquid composition into a shell of cellulosic material unreactive with respect to the liquid composition and the solid polymer formed therefrom, and the heating solution in which said shell is immersed, of a thickness of the order of .001" immersing the shell carrying the liquid composition in a heating bath for a period and at a temperature sufficient to polymerize a liquid composition into a solid polymerized product and thereafter applying to the shell a reagent having a solvent reaction only upon the cellophane for stripping the shell from the solid polymer.

STANLEY WHYTE.
DANIEL D. WHYTE.

REFERENCES CITED

The following references are of record in the file of this patent:

UNITED STATES PATENTS

| Number | Name | Date |
|---|---|---|
| 1,406,730 | Heany | Feb. 14, 1922 |
| 1,554,697 | Alden | Sept. 22, 1925 |
| 2,067,580 | Rohm | Jan. 12, 1937 |
| 2,097,274 | Fields | Oct. 26, 1937 |
| 2,124,871 | Beal | July 26, 1938 |
| 2,356,380 | Chollar | Aug. 22, 1944 |

OTHER REFERENCES

Kratz, "Prevulcanized Latex Molds," Modern Plastics, March 1939, pp. 31 and 64.